United States Patent [19]

Nelle et al.

[11] 4,198,757
[45] Apr. 22, 1980

[54] FASTENING APPARATUS FOR LONGITUDINAL MEASURING SYSTEM

[75] Inventors: Gunther Nelle, Siegsdorf; Alfons Ernst, Traunreut, both of Fed. Rep. of Germany

[73] Assignee: Dr. Johannes Heidenhain GmbH, Traunreut, Fed. Rep. of Germany

[21] Appl. No.: 957,236

[22] Filed: Nov. 2, 1978

Related U.S. Application Data

[63] Continuation of Ser. No. 811,774, Jun. 30, 1977, abandoned.

[30] Foreign Application Priority Data

Jul. 9, 1976 [DE] Fed. Rep. of Germany ....... 2630880

[51] Int. Cl.² .......................... G01B 11/02; G01B 5/02
[52] U.S. Cl. .................................... 33/125 C; 356/373
[58] Field of Search ............... 248/288 A, 181, 188.8, 248/188.9; 250/237 G; 33/125 C, 125 A, 125 R; 356/373, 395

[56] References Cited

U.S. PATENT DOCUMENTS

| 1,757,962 | 5/1930 | Herold | 248/188.9 |
| 2,890,544 | 6/1959 | Manausa | 248/188.9 |
| 3,815,125 | 6/1974 | May et al. | 250/237 G |
| 3,816,002 | 6/1974 | Wieg | 33/125 C |
| 3,816,003 | 6/1974 | Litke | 33/125 C |
| 4,031,595 | 6/1977 | Welker | 33/125 C |

FOREIGN PATENT DOCUMENTS 7504024  2/1975  Fed. Rep. of Germany ........ 33/125 C

*Primary Examiner*—John W. Shepperd
*Attorney, Agent, or Firm*—Hume, Clement, Brinks, William & Olds, Ltd.

[57] ABSTRACT

In a measuring instrument for measuring or adjusting the relative position of two objects, including a measuring scale, a movably mounted sensor housing unit and an elongated hollow body which is resistant to bending and encloses the measuring scale and the movably mounted sensor housing unit to protect them from environmental influences, at least one ball joint for fastening the hollow body to one of the objects to be measured. According to one of the embodiments, two spheres are positioned at a fastening means at one end of the hollow body and a single, centrally-located ball joint is provided at a fastening means at the other end.

14 Claims, 8 Drawing Figures

FASTENING APPARATUS FOR LONGITUDINAL MEASURING SYSTEM

This is a continuation of application Ser. No. 811,744, filed June 30, 1977, now abandoned.

BACKGROUND OF THE INVENTION

The invention relates to an incremental longitudinal measuring instrument for the measuring or adjusting of a relative position of two ojects, wherein a measuring scale and a displaceable sensor housing unit are enclosed in an elongated hollow body resistant to bending to screen the measuring scale and the sensor unit from environmental influences. In particular, the present invention relates to a longitudinal measuring instrument in which the hollow body is fastened to one of the two objects to be measured by means of joints with curved surfaces.

The mounting surfaces for the type of measuring instruments to which the present invention is directed are typically on machine tools and other such devices. Such mounting surfaces are generally not level. In the prior art apparatus are known in which the hollow body of a longitudinal measuring instrument is fastened to a machine tool mounting surface by non-jointed fastening means, such as the unarticulated L-shaped brackets disclosed in May et al U.S. Pat. No. 3,815,125, Weig U.S. Pat. No. 3,816,002, and Litke U.S. Pat. No. 3,816,003. These prior art fastening means typically cause deformation of the measuring instrument and its graduation scale when the instrument is mounted to an uneven machine tool mounting surface, thereby adversely affecting the instrument's precision. Releveling and reworking of the mounting surfaces to correct this effect is generally quite time consuming and expensive.

SUMMARY OF THE INVENTION

According to the present invention, a longitudinal measuring instrument is provided which overcomes the disadvantages of the prior art by fastening the hollow body to a mounting surface by the interposition of joints with curved surfaces, preferably ball joints.

These joints provide a space between the hollow body and a mounting surface and provide a means for accommodating torques and other forces created upon mounting so that the hollow body will not be adversely affected by the uneveness of the mounting surface when it is fastened to the surface.

The mounting by means of such joints of the present invention offers several advantages including: fastening of the measuring scale free from adverse forces, that is, the hollow body and the scale within it suffer no bending or twisting due to torques or other forces even when fastened to uneven mounting surfaces; secure fastening of the hollow body to the machine tool mounting surface; simple mounting; easy manufacture of the joints or articulations; and space-saving design.

Other advantages, objects, and features of the present invention will become apparent upon reading the following detailed description of the preferred embodiments in conjunction with the accompanying drawings.

DESCRIPTION OF THE PREFERRED EMBODIMENTS

Figure 1:
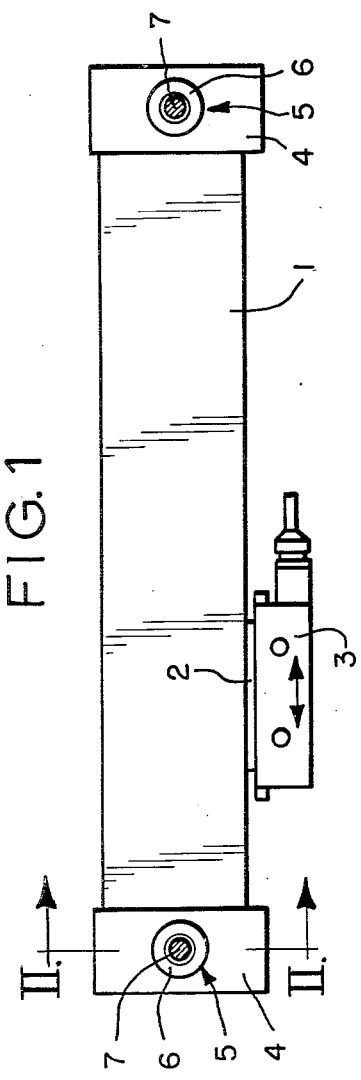
FIG. 1 is a top plan view of a longitudinal measuring instrument embodying the present invention and having two ball joints.
Figure 3:
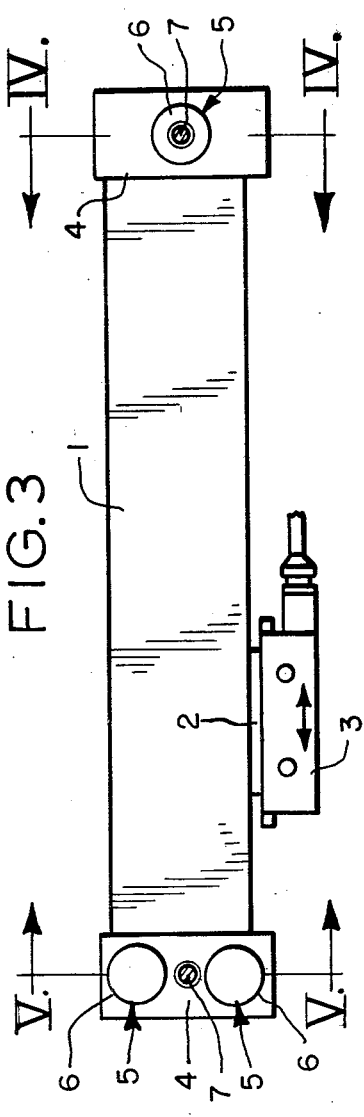
FIG. 3 is a top plan view of an additional longitudinal measuring instrument embodying the present invention and having three ball joints.
Figure 6:
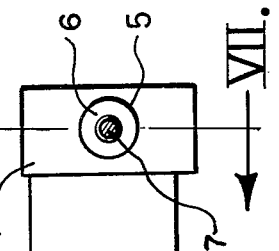
FIG. 6 is a top plan view of a further additional longitudinal measuring instrument embodying the present invention and having a ball joint and a joint including two spheres.

Referring now to the drawings, there are illustrated in FIGS. 1, 3, and 6 three embodiments of the present invention in encapsulated incremental longitudinal measuring instruments of the type disclosed in U.S. Pat. No. 3,816,003 (Litke) and West German Gebrauchsmuster 7 504 024, incorporated by reference herein.

In this measuring instrument for measuring or adjusting the relative position of two objects, the scale (not shown) and the movable sensor housing unit (not shown) having a sensor system are enclosed in an elongated hollow body 1 which is resistant to bending and protects the measuring scale and the sensor housing unit from environmental influences. The hollow body 1 is sealed by means of sealing lips, and a connecting means 2 extends through the sealing lips for connectint the sensor housing unit, which is guided at the scale, to a housing 3 which is fastened to one of the objects to be measured, such as the bed of a machine.

The frontal sides of the hollow body 1 are sealed by a fastening means 4. The fastening of the hollow body 1 to one of the objects, such as a bed of a machine, is accomplished according to the invention by the interposition of ball joints 5 in the fastening means 4. In a preferred embodiment each of the ball joints 5 includes a spherical disc 6 which is adjustably mounted within a recess in the fastening means 4 to provide a means for accommodating torques and other forces exerted between a mounting surface 18 and the hollow body 1. The ball joints 5 allow for a secure fastening, as well as for a rapid mounting of the measuring instrument to the machine tool mounting surface 18 free from adverse forces, such as torques. The hollow body 1 is fastened to the mounting surface 18 by means of fastening members such as screws 7.

Figure 2:
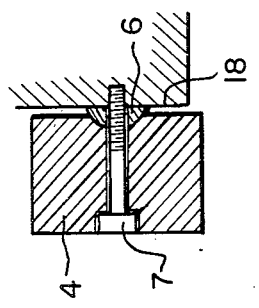
FIG. 2 is a cross-sectional view of the measuring instrument of FIG. 1 taken along line II—II and illustrating a ball joint between the hollow body and a mounting surface.
Figure 5:
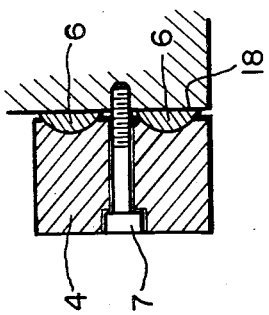
FIG. 5 is a cross-sectional view of the measuring instrument of FIG. 3 taken along line V—V and illustrating two ball joints between the hollow body and a mounting surface.
Figure 8:
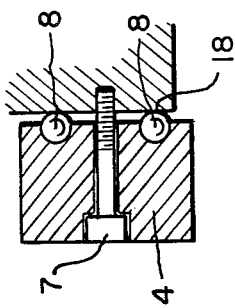
FIG. 8 is a cross-sectional view of the measuring instrument of FIG. 6 taken along line VIII—VIII and illustrating a joint having two spheres.
Figure 4:
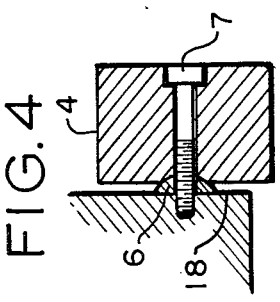
FIG. 4 is a cross-sectional view of the measuring instrument of FIG. 3 taken along line IV—IV and illustrating a ball joint between the hollow body and a mounting surface.
Figure 7:
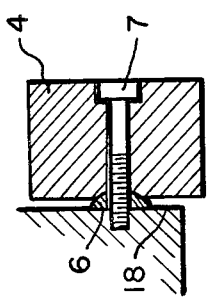
FIG. 7 is a cross-sectional view of the measuring instrument of FIG. 6 taken along line VII—VII and illustrating a ball joint between the hollow body and a mounting surface.

In the embodiment illustrated in FIGS. 1 and 2, the hollow body 1 is mounted by interposition of two ball joints 5, one at each end of the hollow body 1. FIGS. 3, 4 and 5 show an embodiment having a total of three ball joints 5 to provide a three-point support for the hollow body. FIGS. 6, 7, and 8 illustrate an additional embodiment of the present invention having two spheres 8 affixed to a fastening means 4 at one end of the hollow body 1 transversely to the longitudinal axis of the hollow body for adjustable contact therewith, and having a ball joint 5 within the fastening means 4 at the opposite end of the hollow body 1, positioned substantially on the central axis of the hollow body 1.

Though the embodiments hereinbefore described are preferred, many modifications and refinements which do not depart from the true spirit and scope of the invention may be conceived by those skilled in the art. For instance, the spherical discs 6 may be replaced by suitable cylindrical discs. It is intended that all such modifications, including but not limited to the one set forth above, be covered by the following claims.

We claim:

1. An apparatus for mounting a precision measuring instrument to a mounting surface, said apparatus comprising:
   first means for mounting a precision measuring instrument on a mounting surface at a first support area;
   means, included in the first means, for spacing the measuring instrument from the mounting surface;
   second means for mounting the measuring instrument on the mounting surface at a second support area, said second means including two ball joints, each ball joint having an element which defines a recess and a mating element adjustably positioned in the recess, wherein each ball joint is oriented to separate the measuring instrument from the mounting surface such that for each ball joint, relative movement between the respective mating element and recess defining element allows the ball joint to adjust to the mounting surface; and
   means, included in the second means, for securing the measuring instrument to the mounting surface and for locking the two ball joints to substantially prevent relative movement between the recess defining elements and the respective mating elements, said securing means including a fastening member situated between the two ball joints to fasten the measuring instrument to the mounting surface substantially without applying distorting forces to the measuring instrument.

2. The apparatus of claim 1 wherein each of the mating elements includes a disc having a convex, substantially spherical surface and an opposed, substantially planar surface.

3. An apparatus for mounting a precision measuring instrument to a mounting surface, said apparatus comprising:
   first means for mounting a precision measuring instrument on a mounting surface at a first support area;
   means, included in the first means, for spacing the measuring instrument from the mounting surface;
   second means for mounting the measuring instrument on the mounting surface at a second support area, said second means including two ball joints, each having an element which defines a recess and a disc adjustably mounted in the recess, each of said discs having a convex, substantially spherical surface contoured to adjustably fit within the recess and an opposed surface for contacting the mounting surface, wherein each ball joint is oriented to separate the measuring instrument from the mounting surface such that for each ball joint, relative movement between the respective disc and recess defining element allows the ball joint to adjust the mounting surface; and
   means, included in the second means, for securing the measuring instrument to the mounting surface and for locking the two ball joints to substantially prevent relative movement between the recess defining elements and the respective discs, said securing means including a fastening member situated between the two ball joints to fasten the measuring instrument to the mounting surface substantially without applying distorting forces to the measuring instrument.

4. The apparatus of claim 1 or 3 wherein the spacing means includes a ball joint oriented to separate the measuring instrument from the mounting surface and to adjust to the mounting surface.

5. The apparatus of claim 1 or 3 wherein the measuring instrument defines a longitudinal axis extending between the first and second support areas and the two ball joints are arranged along a line substantially transverse to the longitudinal axis.

6. An apparatus for mounting a precision measuring instrument to a mounting surface, said apparatus comprising:
   first means for mounting a precision measuring instrument on a mounting surface at a first support area;
   means, included in the first means, for spacing the measuring instrument from the mounting surface;
   second means for mounting the measuring instrument on the mounting surface at a second support area, said second means including a ball joint having an element which defines a recess and an aperture defining mating element adjustably positioned in the recess, wherein said ball joint is oriented to separate the measuring instrument from the mounting surface such that movement of the mating element with respect to the recess defining element allows the ball joint to adjust to the mounting surface; and
   means, included in the second means, for securing the measuring instrument to the mounting surface and for locking the ball joint to substantially prevent movement of the recess defining element with respect to the mating element, said securing means including a fastening member which passes through the aperture defined in the mating element to fasten the measuring instrument to the mounting surface.

7. The apparatus of claim 6 wherein the mating element includes a disc having a convex, substantially spherical surface and an opposed substantially planar surface.

8. The apparatus of claim 6 wherein the spacing means includes a ball joint oriented to separate the measuring instrument from the mounting surface and to adjust to the mounting surface.

9. The apparatus of claim 8 further including third means for mounting the measuring instrument on the mounting surface wherein the third means includes a ball joint oriented to separate the measuring instrument from the mounting surface and to adjust to the mounting surface.

10. The apparatus of claim 6 wherein the spacing means includes two spheres.

11. An apparatus for fastening first and second aperture defining end sections of an incremental length measuring instrument to a mounting surface, said instrument defining a longitudinal axis extending between said first and second end sections, said aparatus comprising:

a first hemispherical recess formed adjacent the aperture in the first end section substantially on the longitudinal axis;

a first disc adjustably mounted in the first recess, said first disc having a convex spherical surface contoured to adjustably fit within the first recess, a substantially planar opposed surface for contacting a mounting surface, and an opening extending through the first disc substantially aligned with the aperture in the first end section;

first fastening means for securing the first end section to the mounting surface and for substantially eliminating movement of the first disc in the first recess after the first end section has been secured to the mounting surface, said first fastening means including a first fastening member extending through the aperture in the first end section and the opening in the first disc and securable to the mounting surface;

a second hemispherical recess formed adjacent the aperture in the second end section substantially on the longitudinal axis;

a second disc adjustably mounted in the second recess, said second disc having a convex spherical surface contoured to adjustably fit within the second recess, a substantially planar opposed surface for contacting a mounting surface, and an opening extending through the second disc substantially aligned with the aperture in the first end section; and second fastening means for securing the second end section to the mounting surface and for substantially eliminating movement of the second disc in the second recess after the second end section has been secured to the mounting surface, said second fastening means including a second fastening member extending through the aperture in the second end section and the opening in the second disc and securable to the mounting surface.

12. An apparatus for mounting a precision measuring instrument to a mounting surface, said apparatus comprising:

first means for mounting a precision measuring instrument on a mounting surface at a first support area;

means, included in the first means, for spacing the measuring instrument from the mounting surface;

a recess defining surface secured to the measuring instrument, said surface defining a recess;

a disc adjustably mounted in the recess, said disc having a convex, substantially spherical surface contoured to adjustably fit within the recess, and an opposed surface for contacting the mounting surface, said disc defining an aperture passing therethrough between the convex surface and the opposed surface, said disc proportioned to separate the measuring instrument from the mounting surface; and fastening means for securing the measuring instrument to the mounting surface and for locking the disc in position in the recess to substantially prevent movement of the disc, said fastening means including a fastening member which passes through the aperture defined in the disc to fasten the measuring instrument to the mounting surface.

13. An apparatus for fastening first and second aperture defining end sections of an incremental length measuring instrument to a mounting surface, said instrument defining a longitudinal axis extending between said first and second end sections, comprising:

a first hemispherical recess formed adjacent the aperture in the first end section substantially on the longitudinal axis;

a first disc adjustably mounted in the first recess, said first disc having a convex spherical surface contoured to adjustably fit within the first recess, a substantially planar opposed surface for contacting a mounting surface, and an opening extending through the first disc substantially aligned with the aperture in the first end section;

first fastening means for securing the first end section to the mounting surface and for substantially eliminating movement of the first disc in the first recess after the first end section has been secured to the mounting surface, said first fastening means including a first fastening member extending through the aperture in the first end section and the opening in the first disc and securable to the mounting surface;

second and third hemispherical recesses formed in the second end section, so positioned that a line drawn between the second and third recesses is at an angle to the longitudinal axis;

second and third discs adjustably mounted in the second and third recesses, respectively, said second and third discs having convex, substantially spherical surfaces contoured to adjustably fit within the second and third recesses, respectively, and substantially planar opposed surfaces for contacting the mounting surface; and second fastening means for securing the second end section to the mounting surface and for substantially eliminating movement of the second and third discs in the second and third recesses after the second section has been secured to the mounting surface, said second fastening means including a second fastening member extending through the second aperture and securable to the mounting surface.

14. An apparatus for fastening first and second aperture defining end sections of an incremental length measuring instrument to a mounting surface, said instrument defining a longitudinal axis extending between said first and second end sections, comprising:

a first hemispherical recess formed adjacent the aperture in the first end section substantially on the longitudinal axis;

a first disc adjustably mounted in the first recess, said first disc having a convex, substantially spherical surface contoured to adjustably fit within the first recess, a substantially planar opposed surface for contacting the mounting surface, and an opening extending through the first disc substantially aligned with the aperture in the first end section;

first fastening means for securing the first end section to the mounting surface and for substantially locking the first disc in the first recess after the first end section has been secured to the mounting surface, said first fastening means including a first fastening member extending through the aperture in the first end section and the opening in the first disc and securable to the mounting surface;

second and third hemispherical recesses formed in the second end section and so positioned that a line drawn between the second and third recesses is at an angle to the longitudinal axis;

first and second spheres mounted in the second and third recesses, respectively; and second fastening means for rigidly securing the second end section to the mounting surface, said second fastening means including a second fastening member extending through the second aperture and securable to the mounting surface.

* * * * *